(12) United States Patent
Kim et al.

(10) Patent No.: US 11,977,175 B2
(45) Date of Patent: May 7, 2024

(54) METHOD AND APPARATUS FOR ESTIMATING POSITION OF SIGNAL SOURCE

(71) Applicant: AGENCY FOR DEFENSE DEVELOPMENT, Daejeon (KR)

(72) Inventors: Sang Won Kim, Daejeon (KR); Dong Keun Lee, Daejeon (KR); Jeung Min Joo, Daejeon (KR); Jung Hoon Kim, Daejeon (KR); Sung Jin Jo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 352 days.

(21) Appl. No.: 17/480,903

(22) Filed: Sep. 21, 2021

(65) Prior Publication Data

US 2022/0091220 A1    Mar. 24, 2022

(30) Foreign Application Priority Data

Sep. 23, 2020 (KR) .................. 10-2020-0123339

(51) Int. Cl.
*G01S 5/02* (2010.01)
*G01S 5/06* (2006.01)

(52) U.S. Cl.
CPC ............ *G01S 5/0268* (2013.01); *G01S 5/021* (2013.01); *G01S 5/0244* (2020.05); *G01S 5/0247* (2013.01); *G01S 5/0295* (2020.05); *G01S 5/06* (2013.01); *G01S 2205/03* (2020.05); *G01S 2205/07* (2020.05)

(58) Field of Classification Search
CPC .... G01S 5/0268; G01S 5/0244; G01S 5/0295; G01S 5/021; G01S 5/0247; G01S 5/06
USPC ...................................................... 455/456.1
See application file for complete search history.

(56) References Cited

U.S. PATENT DOCUMENTS

2016/0102995 A1* 4/2016 Gum ................. H04W 4/029
702/98

FOREIGN PATENT DOCUMENTS

| KR | 100585499 B1 | 6/2006 |
| KR | 10-2013-0136755 A | 12/2013 |
| KR | 10-2014-0138392 A | 12/2014 |
| KR | 101478642 B1 | 1/2015 |
| KR | 101509569 B1 | 4/2015 |

* cited by examiner

*Primary Examiner* — Joel Ajayi
(74) *Attorney, Agent, or Firm* — MILES & STOCKBRIDGE P.C.

(57) ABSTRACT

Provided is a technology for increasing accuracy of position estimation by estimating a position of a signal source based on an error due to altitudes of a sensor and a signal source and an error due to a pitch of an aircraft as well as an error due to curvature of the earth. At this time, a position estimation method may include receiving measurement data from a plurality of sensors, estimating first position data of the signal source based on the measurement data, identifying an altitude error of the first position data, and estimating second position data that is data obtained by correcting the first position data based on the altitude error.

9 Claims, 7 Drawing Sheets

METHOD AND APPARATUS FOR ESTIMATING POSITION OF SIGNAL SOURCE

CROSS-REFERENCE TO RELATED APPLICATION(S)

This application claims the benefit of Korean Patent Application No. 10-2020-0123339, filed on Sep. 23, 2020, in the Korean Intellectual Property Office, the disclosure of which is incorporated herein by reference in its entirety.

BACKGROUND

1. Field of the Invention

The example embodiments generally relate to a method, apparatus, and system for estimating a position of a signal source and, more particularly, to a technology for estimating a position of a signal source using a mobile sensor in electronic warfare.

2. Description of the Related Art

Currently, to find a position of a signal source, there is a related art method of measuring a direction of a signal and estimating a position of a signal source based on a triangulation method using the direction of the signal. However, this method often causes the following errors. When a distance between the signal source and a mobile sensor is relatively short, the position of the signal source may be estimated using planar map coordinates of a position of the mobile sensor without a large error. However, as the distance between the mobile sensor and the signal source increases, an error generated when the curvature of the earth is not considered may increase. Due to such errors, a planar coordinate system may not be directly applied since the earth has a sphere shape. In addition, such errors cause positional distortion when triangulation using a planar coordination system is applied. Thus, in the related art, Korean Patent Registration 10-1509569B1 discloses a technology for applying a method of estimating a position of a signal source in consideration of the curvature of the earth.

However, the related art does not consider a pitch of an aircraft and a corning error generated based on an elevation of a signal source and thus, may have a relatively low accuracy. Accordingly, the inventors have developed techniques to increase accuracy by measuring an altitude of a signal source in consideration of an error due to a pitch and an altitude of a mobile sensor.

SUMMARY

Accordingly, the embodiments of the present invention are generally directed to a method, apparatus, and system for estimating position of a source signal that substantially obviates one or more problems due to limitations and disadvantages of the related art.

To solve the above issues, an aspect of the present disclosure provides technology for more accurately estimating a position of a signal source in consideration of an error due to a pitch and an altitude of a mobile sensor. Technical goals of the present disclosure are not limited to the aforementioned technical features, and other technical goals may be inferred from example embodiments below.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect, there is provided a method of estimating a position of a signal source, the method including receiving measurement data from a plurality of sensors, estimating first position data of the signal source based on the measurement data, identifying an altitude error of the first position data, and estimating second position data that is data obtained by correcting the first position data based on the altitude error.

The identifying of the altitude error may include identifying an altitude error range based on the altitude error, identifying a reference altitude error tolerance threshold, and identifying a result of comparison between the altitude error range and the reference altitude error tolerance threshold.

When an altitude error range for the first position data is greater than the reference altitude error tolerance threshold, the estimating of the second position data may include estimating the second position data by correcting an altitude of the first position data.

The estimating of the second position data may include determining a direction vector for the signal source using the first position data and position data of the sensors, determining a direction vector for an arrangement of the sensors, estimating direction information of the signal source using the direction vector for the signal source and the direction vector for the arrangement of the sensors, determining an error of the signal source using the direction information of the signal source, and estimating the second position data by reflecting the error.

The estimating of the second position data by reflecting the error may include determining a correction value for reducing the error using a least square error method and estimating the second position data by correcting the first position data based on the correction value.

A limitation may be set for the correction value such that the second position data converge.

The method may further include outputting the corrected second position data when the correction value is less than a reference correction value, or recorrecting the corrected second position data when the correction value is greater than or equal to the reference correction value.

The altitude error may be generated due to a pitch of an aircraft including the sensor and a difference in altitude between the sensor and the signal source.

According to another aspect, there is also provided a non-transitory computer-readable storage medium including a medium configured to store computer-readable instructions, wherein when executed by a processor, the computer-readable instructions allow the processor to perform a method of estimating a position of a signal source, the method including receiving measurement data from a plurality of sensors, estimating first position data of the signal source based on the measurement data, identifying an altitude error of the first position data, and estimating second position data that is data obtained by correcting the first position data based on the altitude error.

According to still another aspect, there is also provided an apparatus for estimating a position, the apparatus including a communicator configured to receive measurement data from a plurality of sensors, a memory configured to store at least one instruction, and a processor configured to execute the at least one instruction to estimate first position data of a signal source based on the measurement data, identify an altitude error of the first position data, and estimate second position data that is data obtained by correcting the first position data based on the altitude error.

Details of example embodiments are included in the detailed description and drawings.

According to example embodiments, there are one or more of the following effects.

First, since a position of a signal source is estimated using attitude-related information such as a pitch of an aircraft and a position of a mobile sensor, it is possible to more accurately estimate the position of the signal source by removing an error that may occur.

Further, it is possible to improve a user's convenience by estimating an optimal position of a signal source for reducing an error in a space using a nonlinear least square error scheme, converting the estimated position into latitude, longitude, and altitude used in general, and outputting a result of the converting.

Further, it is possible to more accurately estimate a position of a signal source by estimating the position of the signal source in consideration of an altitude error of the signal source, which may occur based on a position of a mobile sensor.

Further, it is possible to estimate a position of a signal source using an arrangement direction of sensors and a position of a mobile sensor in an earth-centered earth-fixed (ECEF) coordinate system and convert the estimated position into latitude, longitude, and altitude which are accustomed to a user, thereby removing an error that may occur when estimating the position of the signal.

Further, using an inner product between predicted direction information of a signal source and a direction vector for an arrangement of sensors in a 3D space instead of azimuth direction information of a signal, it is possible to estimate a position from cone-shaped information in the 3D space and remove a corning error and an error due to a pitch of an aircraft.

Effects of the present disclosure are not limited to those described above, and other effects may be made apparent to those skilled in the art from the following description.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long-term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Reference will now be made in detail to the embodiments of the present invention, examples of which are illustrated in the accompanying drawings. Wherever possible, like reference numbers will be used for like elements.

Figure 1:
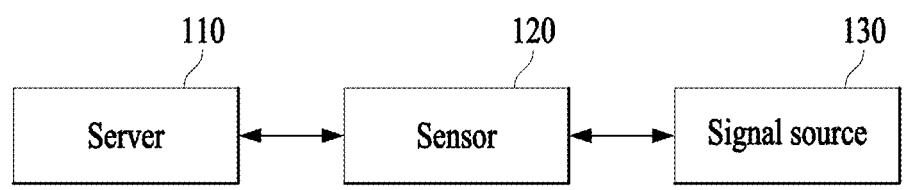
FIG. 1 illustrates a system according to an example embodiment of the present invention.

FIG. 1 illustrates a system according to an example embodiment of the present invention.

Referring to FIG. 1, a system may include at least one of a server 110, a sensor 120, and a signal source 130. FIG. 1 illustrates only components of the system related to the present embodiment. However, it is obvious to those skilled in the art that other general-purpose components may be further included in addition to the components illustrated in FIG. 1.

The server 110 and the sensor 120 may communicate with each other using a network. In addition, the sensor 120 may receive a signal generated from the signal source 130 using a communication network and transmit received information to the server 110. The network may include any one or combinations of a local area network (LAN), a wide area network (WAN), a value-added network (VAN), a mobile radio communication network, and a satellite communications network. Also, the network is a comprehensive data communication network that allows network components of FIG. 1 to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultrawideband (UWB), infrared Data Association (IrDA) communication, and near field communication (NFC), but is not limited thereto.

The sensor 120 may be mounted on a mobile device such as an aircraft and measure information associated with the signal source 130 while moving. At this time, a plurality of sensors 120 may be mounted on the mobile device such as an aircraft to measure the signal generated from the signal source 130 while the mobile device is moving. The server 110 including a position estimation apparatus may receive data measured by the sensor 120 and estimate position data of the signal source 130 by integrating relevant data. At this time, the position data may be data including information associated with a position of the signal source 130.

Here, the position data of the signal source 130 estimated by the server 110 may be increased in accuracy when attitude information such as a pitch of the aircraft and a difference in altitude between the signal source 130 and the mobile device is reflected. Hereinafter, a description is given of content on estimating a position of the signal source 130 by the server 110.

Figure 2:
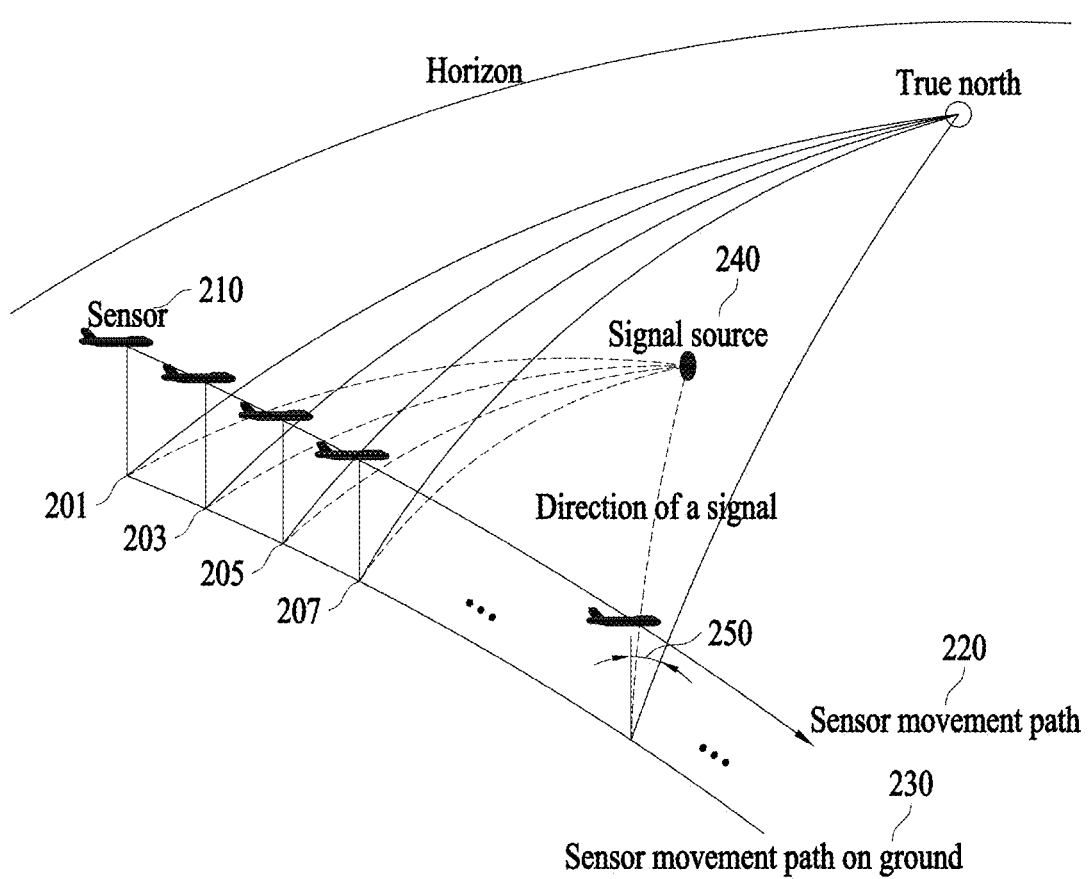
FIG. 2 illustrates detecting a position of a signal source using a mobile device according to an example embodiment of the present invention.

FIG. 2 illustrates detecting a position of a signal source using a mobile device according to an example embodiment of the present invention.

A plurality of sensors 210 mounted on a mobile device such as an aircraft may measure data related to a signal source 240. The sensor 210 mounted on the aircraft may transmit measurement data and position data of the sensor 210 to a server. The server may estimate position data of the signal source by integrating the received information.

The plurality of sensors 210 mounted on the mobile device may move along a sensor movement path 220. At this time, the sensor movement path 220 may correspond to a path through which the aircraft moves. For example, the sensor movement path 220 may be determined based on a path through which the aircraft moves for a period of time from a time T1 to a time T4. In addition, a sensor movement path 230 on the ground may be determined from a movement path of an aircraft moving at a predetermined height from the ground. A position 201 may correspond to a position on the ground of a sensor mounted on an aircraft moving at a height H at the time T1. A position 203 may correspond to a position on the ground of a sensor mounted on an aircraft moving at the height H at a time T2. A position 205 may correspond to a position on the ground of a sensor mounted on an aircraft moving at the height H at a time T3. A position 207 may correspond to a position on the ground of a sensor mounted on an aircraft moving at the height H at the time T4. The sensor movement path 230 on the ground may be determined based on the position 201 through the position 207.

Specifically, when the plurality of sensors mounted on the aircraft measures a direction of the signal source 240, latitude and longitude information corresponding to an i-th sensor may be $\phi_i, \lambda_i$. Here, the i-th sensor may be a sensor mounted on an aircraft corresponding to a time $T_i$. At this time, a heading and a pitch of the aircraft at the corresponding position may be $h_i$ and $p_i$. The heading may be information associated with an axis of the aircraft. The pitch may be information associated with an attitude of the aircraft. In addition, true north-based direction information of the signal source 240 measured at the corresponding position may be $\theta_i$ 250. The true north-based direction information $\theta_i$ 250 includes an error $\eta_i$ at the time of measuring.

The plurality of sensors mounted on the aircraft may measure a relevant signal from the signal source 240. At this time, the sensor may be a device capable of measuring information associated with the signal source 240 and include, for example, a linear array antenna and a planar array antenna. Here, an arrangement direction of the linear array antenna may correspond to a heading direction of the aircraft. The linear array antenna is incapable of measuring an elevation angle in association with the signal source and thus, may assume the elevation angle as a predetermined value to measure a direction of the signal source. As a difference between the elevation angle related to the signal source and the predetermined value increases, an error may be largely reflected in information on a direction measured by the sensor. In addition, because the elevation angle of the signal source may change in response to the pitch of the aircraft changing, an error may be generated in information on a direction measured by the linear array antenna due to the pitch of the aircraft. Accordingly, technology for accurately estimating a position of the signal source by reflected a related error is required. At this time, since a direction with respect to the signal source 240 and the position of the signal source 240 have a nonlinear relationship, position data of the signal source 240 may be repetitively corrected using a least-squared distance error (LSE). A description of such will be given in greater detail with reference to the following drawings.

Figure 3A:
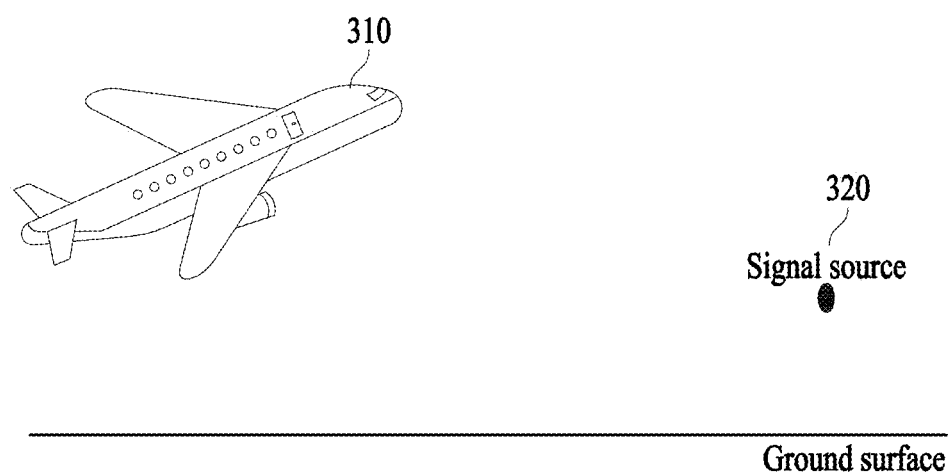
FIGS. 3A through 3C illustrate different attitudes of an aircraft according to example embodiments of the present invention.
Figure 3B:
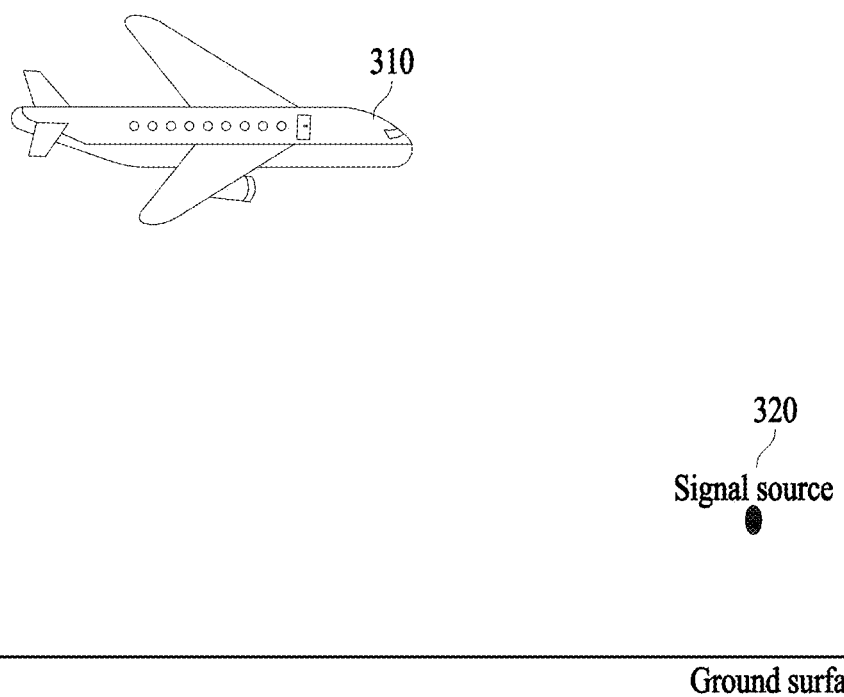
Figure 3C:
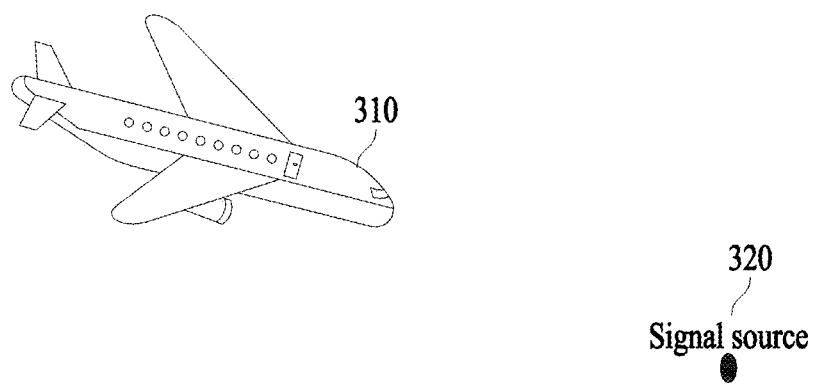

FIGS. 3A through 3C illustrate different attitudes of an aircraft according to example embodiments of the present invention.

Direction information of a signal source 320 may vary based on an attitude of an aircraft, which may lead to an occurrence of an error. Specifically, since an elevation angle may change in response to a pitch of an aircraft changing, information on different directions may be measured despite the same latitude/longitude/altitude of the aircraft. For example, although FIGS. 3A through 3C illustrate the aircraft 310 and the signal source 320 having the same latitude/longitude/altitude, an error may be reflected in direction information in response to the pitch of the aircraft 310 changing.

Figure 4:
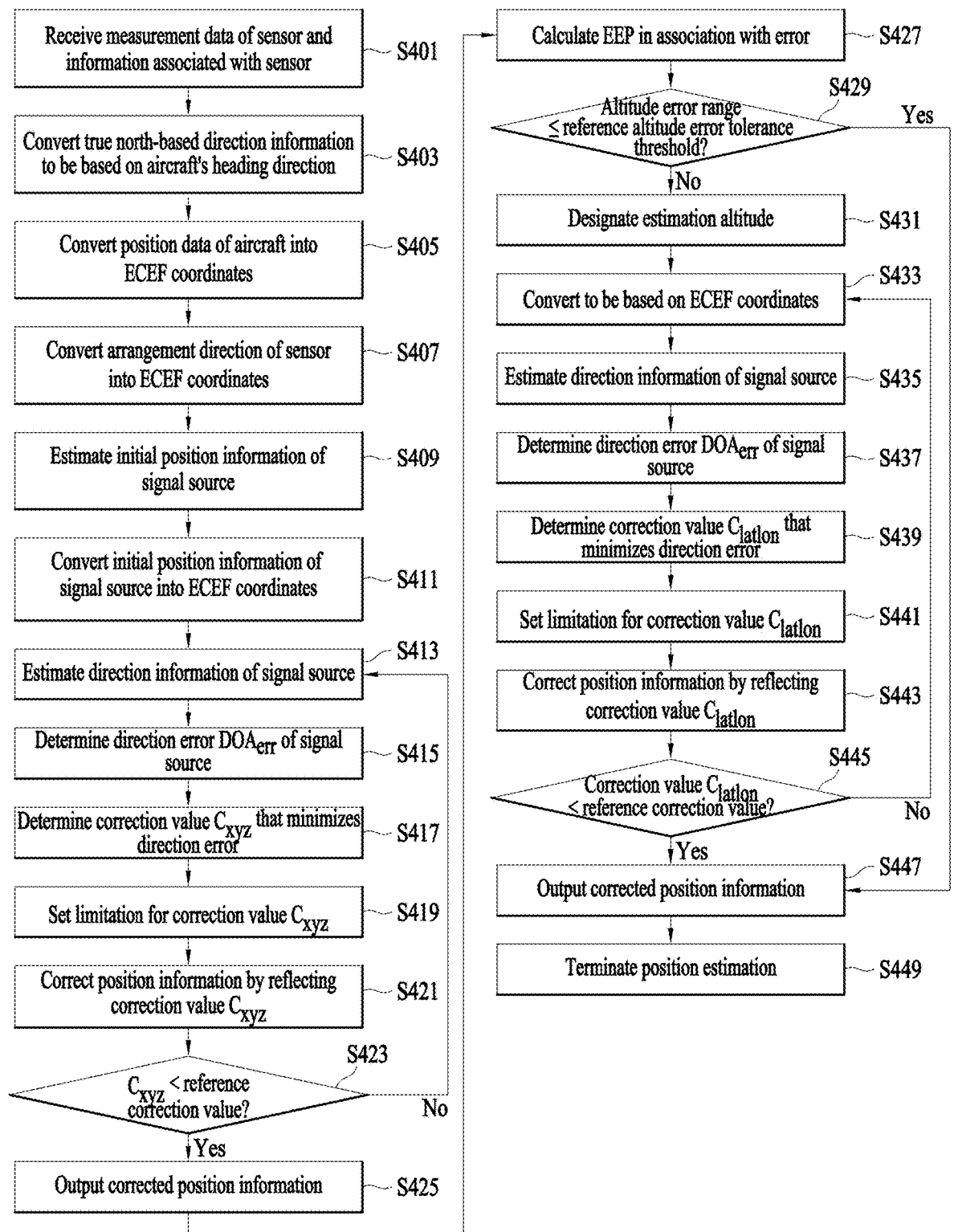
FIG. 4 is a flowchart illustrating a method of estimating a position of a signal source according to an example embodiment of the present invention.

FIG. 4 is a flowchart illustrating a method of estimating a position of a signal source according to an example embodiment of the present invention.

In operation S401, a position estimation apparatus may receive measurement data of a mobile sensor and information associated with the mobile sensor. In operation S403, the position estimation apparatus may convert true north-based direction information to be based on an aircraft's heading direction using the received information. Here, a description will be given based on a linear array antenna located in an aircraft as an example of the mobile sensor. An arrangement direction of the linear array antenna may correspond to a heading direction of the aircraft. Specifically, the position estimation apparatus may receive data related to a direction of a signal source measured by the mobile sensor based on the true north. In addition, at the moment of measuring data as the information associated with the mobile sensor, the position estimation apparatus may receive information (for example, position data of the sensor, the heading direction of the aircraft, and the like) associated with the sensor. For example, the position estimation apparatus may receive at least one of the arrangement direction of the linear array antenna, the true north-based direction information, the position data of the sensor, and the heading direction of the aircraft. The position estimation apparatus may determine $DOA_{meas}$ based on relevant information as shown in Equation 1 below. Here, $DOA_{meas}$ may be direction information determined based on the measurement data, which is actually measured direction information.

$$DOA_{meas}=(\theta_1-h_1,\theta_2-h_2\ldots,\theta_n-h_n)^T \quad \text{[Equation 1]}$$

In operation S405, at the moment of measuring data, the position estimation apparatus may convert the position data of the aircraft into coordinates on an earth-centered earth-fixed (ECEF) coordinate system. Specifically, the position estimation apparatus may convert the position data of the aircraft (or the mobile sensor) into coordinates $AC_{ECEF}$ on the ECEF coordinate system. Here, the ECEF coordinate system is a coordinate system that represents a spatial position with x, y, and z based on the center of the earth as an origin and is a coordinate system capable of removing distortion due to a curvature of the earth caused by expressing coordinates in latitude and longitude. Here, the ECEF coordinate system is used as an example of the present specification, and other coordinate systems capable of removing the distortion due to the curvature of the earth may also be included in the scope of the present specification.

In operation S407, at the moment that the sensor measured the data, the position estimation apparatus may convert the arrangement direction of the sensor into coordinates $S_{ECEF}$ on the ECEF coordinate system based on the relevant information. Specifically, the position estimation apparatus may use the position data (for example, latitude, longitude, and altitude) of the mobile sensor and information on a heading $h_i$ and a pitch $p_i$ of the aircraft to convert the arrangement direction of the sensor into the coordinates on the ECEF coordinate system at the moment that the sensor measures the data.

In operation S409, the position estimation apparatus may estimate initial position information of the signal source based on the relevant information. At this time, an altitude of the initial position information may be set to zero (the ground surface). Based on the initial position information of the signal source, the position data may be corrected using a nonlinear LSE scheme. Such initial position information may be determined using the method disclosed in Korean Patent Registration No. 10-1509569B1.

In operation S411, the position estimation apparatus may convert the initial position information of the signal source into coordinates $P_{ECEF}$ on the ECEF coordinate system.

In operation S413, the position estimation apparatus may estimate direction information of the signal source based on the relevant information. Specifically, the position estimation apparatus may determine a direction vector for the signal source according to a sensor's position using $P_{ECEF}$ and $AC_{ECEF}$. Through an operation between the determined direction vector and $S_{ECEF}$ corresponding to a direction vector for an arrangement of sensors, predicted direction information $DOA_{est}$ of the signal source according to the arrangement of the sensors may be estimated. At this time, $DOA_{est}$ may be determined through Equation 2 below. In Equation 2, i denotes a position of an i-th mobile sensor and an arrangement direction of the sensor.

$$DOA_{est_i}(A_{ECEF_i}, P_{ECEF}, S_{ECEF_i}) = \quad \text{[Equation 2]}$$

-continued
$$\quad \acos\left(\frac{(P_{ECEF}-A_{ECEF_i})\cdot(S_{ECEF_i})}{|P_{ECEF}-A_{ECEF_i}||S_{ECEF_i}|}\right)$$

In operation S415, the position estimation apparatus may determine a direction error $DOA_{err}$ of the signal source according to Equation 3. Specifically, the position estimation apparatus may determine $DOA_{err}$ such that the position of the signal source is estimated to be a position that minimizes a difference between $DOA_{est}$ and $DOA_{err}$ through a comparison therebetween. The position estimation apparatus may determine the direction error $DOA_{err}$ based on $P_{ECEF}$ as shown in Equation 3 below.

$$DOA_{err} = DOA_{est} - DOA_{meas} \quad \text{[Equation 3]}$$

$$DOA_{err} = \begin{pmatrix} DOA_{est_1} - DOA_{meas_1} \\ DOA_{est_2} - DOA_{meas_1} \\ \vdots \\ DOA_{est_3} - DOA_{meas_1} \end{pmatrix}$$

In operation S417, the position estimation apparatus may determine a Jacobian matrix $J_{xyz}$ and determine a correction value that minimizes the direction error using the Jacobian matrix $J_{xyz}$. Specifically, when $P_{ECEF}$ is Equation 4 below, the Jacobian matrix $J_{xyz}$ may be determined through Equation 5 below.

$$P_{ECEF} = \{x_p, y_p, z_p\}^T \quad \text{[Equation 4]}$$

$$J_{xyz} = \begin{pmatrix} \frac{\partial DOA_{est_1}}{\partial x_p} & \frac{\partial DOA_{est_1}}{\partial y_p} & \frac{\partial DOA_{est_1}}{\partial z_p} \\ \vdots & \vdots & \vdots \\ \frac{\partial DOA_{est_n}}{\partial x_p} & \frac{\partial DOA_{est_n}}{\partial y_p} & \frac{\partial DOA_{est_n}}{\partial z_p} \end{pmatrix} \quad \text{[Equation 5]}$$

Based on the direction error $DOA_{err}$ and the Jacobian matrix $J_{xyz}$, the position estimation apparatus may determine a correction value $C_{xyz}$ for correcting the position of the signal source using a least-square distance error method as shown in Equation 6 below.

$$C_{xyz}=(J_{xyz}{}^T J_{xyz})^{-1} J_{xyz}{}^T DOA_{err} \quad \text{[Equation 6]}$$

In operation S419, the position estimation apparatus may set a limitation for the correction value $C_{xyz}$. Specifically, the position estimation apparatus may prevent divergence of the estimated position information by setting the limitation for $C_{xyz}$. This is because the divergence may occur due to an application of an excessive correction value in some cases since the Jacobian matrix uses a gradient about the current estimated position information when determining a correction value for subsequent estimated position information based on the current estimated position information and the Jacobian matrix.

In operation S421, the position estimation apparatus may correct the position information of the signal source by reflecting the correction value $C_{xyz}$. Specifically, the position estimation apparatus may correct the position information of the signal source as shown in Equation 7 below.

$$P_{ECEF}=P_{ECEF}+C_{xyz} \quad \text{[Equation 7]}$$

In operation S423, the position estimation apparatus may compare the correction value $C_{xyz}$ and a reference correction value. Here, the reference correction value may be a value determined according to statistics or set by a user. Specifically, when the correction value $C_{xyz}$ is greater than or equal to the reference correction value, the position estimation apparatus may perform again from operation S413 using the position information corrected in operation S421. Accordingly, the position information of the signal source may be gradually corrected, which may lead to an increase in accuracy. When the correction value $C_{xyz}$ is less than the reference correction value, the position estimation apparatus may perform operation S425.

In operation S425, the position estimation apparatus may output the position information corrected in operation S421. Specifically, the position estimation apparatus may output $P_{LLA}$ obtained by converting the position information into a latitude, a longitude, and an altitude. For example, the output position information may correspond to first position data of the signal source. The first position data may correspond to position information estimated before operation S431.

In operation S427, the position estimation apparatus may calculate an elliptical error probable (EEP) in association with the error in the estimated position information. Specifically, the position estimation apparatus may identify an error range by identifying calculated position information and an estimated error. More specifically, numerous errors may be generated in the estimated position information in association with the altitude. This is due to characteristics of a horizontal linear array antenna having no function to measure the elevation angle of the signal source. As a position in which the mobile sensor senses a signal from the signal source is narrower, an error distribution of the estimated position information may form an ellipse like a vertically erected circular band centered on a movement axis of the aircraft, and a large altitude error may be generated in the estimated position information due to noise. At this time, the generated altitude error may cause errors in the latitude and longitude.

In operation S429, the position estimation apparatus may verify whether the altitude error range is less than or equal to a reference altitude error tolerance threshold. Specifically, the position estimation apparatus may identify an altitude error range based on an altitude error component of the estimated position information and verify whether the altitude error range is less than or equal to the reference altitude error tolerance threshold. At this time, the reference altitude error tolerance threshold may be a value set based on statistics or set by a user. When the altitude error range is less than or equal to the reference altitude error tolerance threshold, the position estimation apparatus may output the corresponding estimated position information. When the altitude error range is greater than the reference altitude error tolerance threshold, the user may designate an altitude in association with the position information of the signal source to be estimated in operation S431. After that, the position estimation apparatus may estimate the position of the signal source at the designated altitude. Since the altitude may be differently reflected in the ECEF coordinate system based on the latitude and the longitude, the altitude may be corrected in latitude, longitude, and altitude coordinate systems. Specifically, the altitude may be corrected at $P_{LLA}$. Here, the first position data for which the altitude is designated may correspond to an initial value of second position data. The second position data may correspond to the position information estimated after operation S431.

In operation S433, the position estimation apparatus may convert the position information $P_{LLA}$ of the signal source of which the altitude is changed, to be based on ECEF coordinates. Specifically, the position estimation apparatus may convert the position information $P_{LLA}$ of the signal source of which the altitude is changed, into $P_{ECEF}$ on the ECEF coordinates.

In operation S435, the position estimation apparatus may estimate direction information of the signal source based on relevant information. Specifically, the position estimation apparatus may estimate predicted direction information $DOA_{est}$ of the signal source using $P_{ECEF}$ corresponding to the position information of the signal source of which the altitude is changed in operation S433. The above description may also apply to operation S435.

In operation S437, the position estimation apparatus may determine a direction error $DOA_{err}$ of the signal source. The above description may also apply to operation S437.

In operation S439, the position estimation apparatus may determine a Jacobian matrix $J_{latlon}$ and determine a correction value that minimizes the direction error using the Jacobian matrix $J_{latlon}$. Specifically, the Jacobian matrix $J_{latlon}$ may be determined through Equation 8 below. Through the Jacobian matrix $J_{latlon}$, a change in error due to a latitude/longitude change may be identified. $P_{ECEF}$ used as an input of $DOA_{est}$ in the Jacobian matrix $J_{latlon}$ of Equation 8 may be a value obtained by converting a position (λ, λ, H) for which latitude, longitude, and altitude of the signal source are estimated, into ECEF coordinates. At this time, the altitude may be the altitude corrected in operation S431.

$$J_{latlon} = \begin{pmatrix} \frac{\partial DOA_{est_1}}{\partial \phi} & \frac{\partial DOA_{est_1}}{\partial \lambda} \\ \vdots & \vdots \\ \frac{\partial DOA_{est_n}}{\partial \phi} & \frac{\partial DOA_{est_n}}{\partial \lambda} \end{pmatrix} \qquad \text{[Equation 8]}$$

Using the direction error $DOA_{err}$ and the Jacobian matrix $J_{latlon}$, a correction value that minimizes the direction error may be determined. Specifically, the position estimation apparatus may determine a correction value $C_{latlon}$ for correcting the position of the signal source using the least-square distance error method as shown in Equation 9 below.

$$C_{latlon} = (J_{latlon}{}^T J_{latlon})^{-1} J_{latlon}{}^T DOA_{err} \qquad \text{[Equation 9]}$$

In operation S441, the position estimation apparatus may set a limitation for the correction value $C_{latlon}$. Specifically, the position estimation apparatus may prevent divergence of the estimated position information by setting a limitation for the correction value $C_{latlon}$.

In operation S443, the position estimation apparatus may correct the position information of the signal source by reflecting the determined correction value $C_{latlon}$. Specifically, the position estimation apparatus may correct the position information of the signal source as shown in Equation 10 below. When correcting the position information of the signal source, only a correction value for latitude/longitude of the signal source may be applied so that an altitude value designated by a user may not be corrected. Through this, an optimal position of the signal source at the altitude designated by the user may be estimated. At this time, the corrected position information may correspond to the second position data. That is, the second position data may correspond to a value obtained by correcting the first position data.

$$P_{LLA} = P_{LLA} + C_{latlon} \qquad \text{[Equation 10]}$$

In operation S445, the position estimation apparatus may compare the correction value $C_{latlon}$ and the reference correction value. Here, the reference correction value may be a value determined according to statistics or set by a user. Specifically, when the correction value $C_{latlon}$ is greater than or equal to the reference correction value, the position estimation apparatus may perform again from operation S433 using the position information corrected in operation S443. Accordingly, the position information of the signal source may be gradually corrected, which may lead to an increase in accuracy. When the correction value $C_{latlon}$ is less than the reference correction value, the position estimation apparatus may terminate estimating the position information.

In operation S447, the position estimation apparatus may output the position information corrected in operation S443. Specifically, the position estimation apparatus may output $P_{LLA}$ obtained by converting the position information into the latitude, the longitude, and the altitude.

In operation S449, the position estimation apparatus may terminate estimating the position of the signal source.

According to the example embodiment, a position of the signal source in a 3D space may be estimated by removing an error due to the pitch of the aircraft and a corning error using an operation between the direction vector of the arrangement of the sensors and the direction vector of the signal source in the 3D space.

Figure 5:
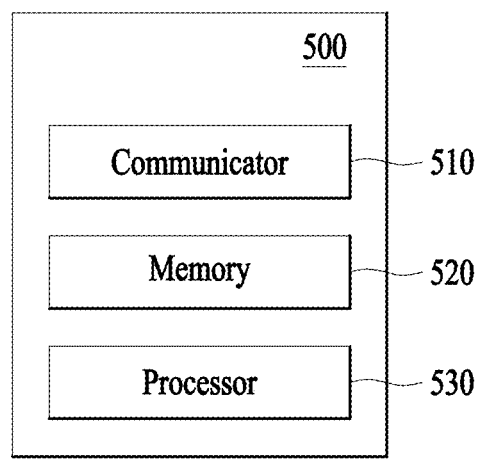
FIG. 5 is a block diagram illustrating a position estimation apparatus according to an example embodiment of the present invention.

FIG. 5 is a block diagram illustrating a position estimation apparatus according to example embodiment of the present invention.

According to an example embodiment, a position estimation apparatus 500 may include a communicator 510, a memory 520, and a processor 530. FIG. 5 illustrates only components of the position estimation apparatus 500 related to the present example embodiment. However, it will be understood by those skilled in the art that other general-purpose components may be further included in addition to the components illustrated in FIG. 5. Since the position estimation apparatus 500 may include content on the electronic apparatus described above, a redundant description will be omitted.

The communicator 510 may receive measurement data from a plurality of sensors mounted on an aircraft using wired and wireless communication. In addition, the communicator 510 may receive position data corresponding to the aircraft and a sensor mounted on the aircraft using wired and wireless communication. The processor 530 may control overall operations of the position estimation apparatus 500 and process data and signals. The processor 530 may include at least one hardware unit. Also, the processor 530 may be operated by one or more software modules generated by executing a program code stored in the memory 520. The processor 530 may execute the program code stored in the memory 520 to control the overall operations of the position estimation apparatus 500 and process data and signals. The position estimation apparatus 500 may be included in a server and used to estimate a position of a signal source. At this time, the position estimation apparatus 500 may reflect an error according to an elevation of the signal source and a pitch of the aircraft, thereby estimating position data of the signal source with increased accuracy.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims. It will be apparent to those skilled in the art that various modifications and variations can be made in the of the present invention without departing from the spirit or scope of the invention. Thus, it is intended that the present invention cover the modifications and variations of this invention provided they come within the scope of the appended claims and their equivalents

What is claimed is:

1. A method of estimating a position of a signal source, the method comprising:
   receiving measurement data from a plurality of sensors;
   estimating first position data of the signal source based on the measurement data;
   identifying an altitude error of the first position data; and
   estimating second position data that is data obtained by correcting the first position data based on the altitude error, wherein the estimating of the second position data includes estimating a position of a signal source in a three-dimensional (3D) space by removing a corning error and an error due to a pitch of an aircraft, using an operation between a direction vector for an arrangement of the sensors and a direction vector for the signal source in the 3D space.

2. The method of claim 1, wherein the identifying of the altitude error comprises:
   identifying an altitude error range based on the altitude error;
   identifying a reference altitude error tolerance threshold; and identifying a result of comparison between the altitude error range and the reference altitude error tolerance threshold.

3. The method of claim 2, wherein when an altitude error range for the first position data is greater than the reference altitude error tolerance threshold, the estimating of the second position data comprises:
    estimating the second position data by designating an altitude of the first position data.

4. The method of claim 1, wherein the estimating of the first position data comprises:
    determining a direction vector for the signal source using the measurement data and position data of the sensors;
    determining a direction vector for an arrangement of the sensors;
    estimating predicted direction information of the signal source using an operation between the direction vector for the signal source and the direction vector for the arrangement of the sensors;
    determining an error of the signal source using direction information based on the measurement data and the predicted direction information;
    determining a correction value using a least square error method to reduce the error; and
    correcting position information of the signal source by reflecting the correction value.

5. The method of claim 1, wherein the estimating of the second position data comprises:
    setting the first position data for which an altitude is designated, to be initial position information;
    determining a direction vector for the signal source using position data of the sensors;
    determining a direction vector for an arrangement of the sensors;
    estimating predicted direction information of the signal source using an operation between the direction vector for the signal source and the direction vector for the arrangement of the sensors;
    determining an error of the signal source using direction information based on the measurement data and the predicted direction information;
    determining a correction value for a latitude and a longitude excluding an altitude using a least square error method to reduce the error; and
    correcting position information of the signal source by reflecting the correction value.

6. The method of claim 5, wherein a limitation is set for the correction value such that the second position data converge.

7. The method of claim 5, further comprising:
    outputting a corrected second position data when the correction value is less than a reference correction value, or recorrecting the corrected second position data when the correction value is greater than or equal to the reference correction value.

8. A non-transitory computer readable medium having instructions stored thereon that, when executed by a processor, cause the processor to perform a method of estimating a position of a source signal, the instructions comprising:
    receiving measurement data from a plurality of sensors;
    estimating first position data of the signal source based on the measurement data;
    identifying an altitude error of the first position data; and
    estimating second position data that is data obtained by correcting the first position data based on the altitude error, wherein the estimating of the second position data includes estimating a position of a signal source in a three-dimensional (3D) space by removing a corning error and an error due to a pitch of an aircraft, using an operation between a direction vector for an arrangement of the sensors and a direction vector for the signal source in the 3D space.

9. An apparatus for estimating a position, the apparatus comprising:
    a communicator configured to receive measurement data from a plurality of sensors;
    a memory configured to store at least one instruction; and
    a processor configured to execute the at least one instruction to estimate first position data of a signal source based on the measurement data, identify an altitude error of the first position data, and estimate second position data that is data obtained by correcting the first position data based on the altitude error,
    wherein the processor configured to estimate a position of a signal source in a three-dimensional (3D) space by removing a corning error and an error due to a pitch of an aircraft, using an operation between a direction vector for an arrangement of the sensors and a direction vector for the signal source in the 3D space when estimating the second position data.

* * * * *